(12) United States Patent
Tin (10) Patent No.: US 7,986,829 B2
(45) Date of Patent: Jul. 26, 2011

(54) GENERATING A TRANSFORMED INTERIM CONNECTION SPACE FOR SPECTRAL DATA

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 11/947,487

(22) Filed: Nov. 29, 2007

(65) Prior Publication Data

US 2009/0141970 A1    Jun. 4, 2009

(51) Int. Cl.
*G06K 9/00* (2006.01)
(52) U.S. Cl. ........................................ 382/162; 382/167
(58) Field of Classification Search .................. 382/162, 382/167; 345/590, 604
See application file for complete search history.

(56) References Cited

U.S. PATENT DOCUMENTS

| | | | |
|---|---|---|---|
| 6,088,038 A * | 7/2000 | Edge et al. ..................... | 345/600 |
| 6,587,793 B2 | 7/2003 | Viassolo et al. ................ | 702/27 |
| 6,633,660 B1 * | 10/2003 | Schotland ..................... | 382/131 |
| 6,698,860 B2 | 3/2004 | Berns et al. | |
| 6,798,904 B2 | 9/2004 | Borg ............................ | 382/167 |
| 6,850,342 B2 | 2/2005 | Woolfe et al. | |
| 6,920,244 B2 | 7/2005 | Rosen et al. | |
| 7,072,511 B2 | 7/2006 | Tan et al. | |
| 7,081,925 B2 | 7/2006 | Yang et al. | |
| 7,184,057 B2 | 2/2007 | Stokes et al. .................. | 345/600 |
| 7,245,395 B2 | 7/2007 | Couwenhoven et al. ...... | 358/1.9 |
| 2002/0159081 A1 * | 10/2002 | Zeng ............................. | 358/1.9 |
| 2002/0165684 A1 | 11/2002 | Olson | |
| 2002/0196972 A1 | 12/2002 | Bayramoglu et al. ........ | 382/167 |
| 2005/0007278 A1 * | 1/2005 | Anson et al. .................. | 342/451 |
| 2005/0069200 A1 | 3/2005 | Speigle et al. ................ | 382/162 |
| 2006/0158881 A1 * | 7/2006 | Dowling ....................... | 362/231 |
| 2006/0251324 A1 * | 11/2006 | Bachmann et al. ........... | 382/173 |
| 2007/0076000 A1 * | 4/2007 | Brand ........................... | 345/440 |
| 2007/0121132 A1 * | 5/2007 | Blinn et al. ................... | 358/1.9 |
| 2009/0091760 A1 * | 4/2009 | Ehbets et al. ................. | 356/419 |

OTHER PUBLICATIONS

Urban et al. ("Accelerating spectral-based color separation within the Neugebauer subspace,"J. Electronic Imaging, 16(4), 043014 (Oct.-Dec. 2007), pp. 1-11.*
Berns et al. ("Multi-spectral-based color reproduction research at the Munsell Color Science Laboratory," SPIE 3409 (1998), pp. 14-25).*
Derhak et al. ("Spectral colometry using LabPQR—An interim connection space," J. Imaging Science and Technology, 50(1), 2006, pp. 53-63).*

(Continued)

*Primary Examiner* — Yubin Hung
(74) *Attorney, Agent, or Firm* — Fitzpatrick, Cella, Harper & Scinto (57) ABSTRACT

Generation of a transformed Interim Connection Space for spectral data is provided. A first Interim Connection Space for spectral data in a full spectral space is accessed. A first map, which characterizes a linear transformation from the full spectral space to a first color space, is accessed. A second map, which characterizes a linear transformation from the first Interim Connection Space to the first color space, is determined. The first Interim Connection Space is decomposed into orthogonal subspaces, the orthogonal subspaces including a first subspace that is a null space of the second map and a second subspace that is an orthogonal complement of the null space in the first Interim Connection Space. The transformed Interim Connection Space is generated based on the first subspace and the second subspace.

16 Claims, 6 Drawing Sheets

OTHER PUBLICATIONS

M.R. Rosen ("Navigating the roadblocks to spectral color reproduction—Data-efficient multichannel spectral imaging and spectral color management", Ph.D. Dissertation (2003), pp. 22-56 & 171-198).*

Romney, et al., "Munsell Reflectance Spectra in 3-D Euclidean Space", Color Research & Application, vol. 128, No. 3, pp. 182-196, Jun. 2003.

Greenburg, "A Framework for Realistic Image Synthesis", Communications of the ACM, vol. 42, No. 8, pp. 45-53, Aug. 1999.

Wyszecki, et al., "Color Science: Concepts and Method, Quantitative Data and Formulae", 2nd Ed., Wiley, (1982).

ISO/TR 16066:2003(E), "Graphic Technology—Standard Object Color Spectra Database for Color Reproduction Evaluation" (SOCS), ISO (2003).

Johnson, et al., "Full-Spectral Color Calculations in Realistic Image Synthesis", IEEE Computer Graphics and Applications (1999).

Li, et al., "Color Constancy Based on Reflectance Functions", Proc. 14th CIC, pp. 175-179 (2006).

U.S. Appl. No. 11/954,184, filed Dec. 11, 2007, entitled "Spectral Gamut Mapping Based on a Colorimetric Gamut Mapping" by Siu-Kei Tin.

U.S. Appl. No. 11/947,741, filed Nov. 29, 2007, entitled "Generating an Interim Connection Space for Spectral Data" by Siu-Kei Tin.

U.S. Appl. No. 11/948,977, filed Nov. 30, 2007, entitled "Generating a Device Independent Interim Connection Space for Spectral Data" by Siu-Kei Tin.

U.S. Appl. No. 12/011,318, filed Jan. 23, 2008, entitled "Gamut Mapping in Spectral Space Based on an Objective Function" by Siu-Kei Tin.

Rosen, Mitchell R. and Ohta, Nobru, "Spectral Color Processing using an Interim Connection Space", Proc. 11th CIC, pp. 187-192 (2003).

Derhak, Maxim W. and Rosen, Mitchell R., "Spectral Colorimetry Using LabPQR-An Interim Connection Space", Proc. 12th CIC, pp. 246-250 (2004).

Tsutsumi, Shohei, Rosen, Mitchell R. and Berns, Roy S., "Spectral Reproduction using LabPQR: Inverting the Fractional-Area-Coverage-to-Spectra Relationship", Proc. ICIS'06, pp. 107-110 (2006).

Tsutsumi, Shohei, Rosen, Mitchell R., and Berns, Roy S., "Spectral Color Management using Interim Connection Spaces based on Spectral Decomposition", Proc. 14th CIC, pp. 246-251 (2006).

Rosen, Mitchell R. and Derhak, Maxim W., "Spectral Gamuts and Spectral Gamut Mapping" Proc. of SPIE-IS&T vol. 6062, pp. 1-11 (2006).

Rosen, et al., "Answering Hunt's Web Shopping Challenge: Spectral Color Management for a Virtual Swatch", Proc. of the IS&T/SID 9th Color Imaging Conference, pp. 267-272.

U.S. Appl. No. 11/609,280, filed Dec. 11, 2006, Inventor: Siu-Kei Tin.

* cited by examiner

GENERATING A TRANSFORMED INTERIM CONNECTION SPACE FOR SPECTRAL DATA

BACKGROUND OF THE INVENTION

1. Field of the Invention

This invention pertains to Interim Connection Spaces for spectral data, and in particular, generation of transformed Interim Connection Spaces for spectral data based on a linear transformation from the full spectral space to a color space.

2. Related Background Art

There is an increasing trend for color imaging applications to process and utilize spectral data, and/or to perform color processing in a spectral color space. For example, it has become common to characterize color devices such as scanners, cameras, printers and displays, in terms of their spectral responsivity, such as by obtaining a so-called spectral device profile. Once a spectral characterization of a device is obtained, operations such as transforming color data from a source device to a destination device, gamut mapping, etc., can be performed in the full spectral space.

As another example, some modern image capture devices can capture color image data in spectral or extended color spaces. In this regard, the use of spectral data such as spectral reflectance of objects and spectral power distribution of illuminants promises to yield even more advantages in the near future. Ultimately, one goal of spectral color reproduction is to produce color reproductions with remarkably high color fidelity, perhaps even matching the original scene on the spectral level. In the case of reflective objects, for example, a reproduction with a spectral match would have the same color as the original object under any illuminant.

Spectral characterization of color devices, and development of multi-spectral devices such as multi-spectral cameras and multi-spectral printers, could form the basis of a spectral color management workflow that can have very useful applications in everyday consumer products. For example, such technologies could allow online shoppers to print their own "virtual swatches" of fabrics, as detailed in the paper "Answering Hunt's Web Shopping Challenge: Spectral Color Management for a Virtual Swatch" by Rosen et al., Proceedings of the IS&T/SID $9^{th}$ Color Imaging Conference, pp. 267-272. Another application of spectral color management in computer aided design/computer aided manufacturing (CAD/CAM) applications allows manufacturers to visualize and demonstrate preliminary design ideas by simulation, before actually building a costly prototype.

While the use of spectral data can provide many advantages, such as reducing metameric color shifts, using spectral data presents some challenges. In particular, the dimensionality of spectral data typically is high compared to other types of data, such as colorimetric data. For example, conventional colorimetry-based spaces such as CIEXYZ, CIELAB, and CIECAM02, etc., have three dimensions, while full spectral space typically has thirty-one dimensions or more. This high dimensionality can significantly increase the amount of data that must be manipulated and/or stored by applications utilizing full spectral data. Consequently, these applications can suffer from increased memory requirements and decreased computational performance.

A known approach to this problem is the construction of Interim Connection Spaces (ICSs), which are of lower dimensionality than the full spectral space, for example, with five or higher dimensions as opposed to the thirty-one or higher dimensions of a full spectral space. In particular, typical Interim Connection Spaces provide a way to project full spectral data to lower-dimensional data with a small loss of accuracy. Processing can then occur on the lower-dimensional data, and if needed, results of the processing can be transformed into full spectrum data.

SUMMARY OF THE INVENTION

To address the foregoing, the present invention provides for generation of a transformed Interim Connection Space.

In one example embodiment of the present invention, a first Interim Connection Space for spectral data in a full spectral space is accessed. A first map, which characterizes a linear transformation from the full spectral space to a first color space, is accessed. A second map, which characterizes a linear transformation from the first Interim Connection Space to the first color space, is determined. The first Interim Connection Space is decomposed into orthogonal subspaces, the orthogonal subspaces including a first subspace that is a null space of the second map and a second subspace that is an orthogonal complement of the null space in the first Interim Connection Space. The transformed Interim Connection Space is generated based on the first subspace and the second subspace.

The transformed Interim Connection Space can provide several advantages, which are particularly evident when the transformed ICS is utilized in various applications, such as spectral gamut mapping. In one benefit, for example, the transformed ICSs have a decomposition into null space components, such as metameric black subspace, and components that are complements of the null space, such as colorimetric space. In addition, certain geometric operations, such as intersecting a plane of constant colorimetry with a convex hull, can be much faster in a transformed ICS. This can lead to simpler and more efficient spectral color management system.

Another potential benefit of a transformed ICS might be realized in applications that use a "rendering directive," such as "minimizing colorimetric errors first under a particular illuminant, then the spectral error." In particular, the transformed ICS should be able to better incorporate the rendering directive to the effect that, for example, spectral gamut mapping can be implemented more effectively.

In one example aspect of the invention, decomposing the first Interim Connection Space includes performing eigen-analysis of the second map to obtain the first subspace and the second subspace.

In another example aspect of the invention, the second map is described by a matrix, and performing eigen-analysis of the second map includes performing singular value decomposition on the matrix.

In yet another example aspect of the present invention, the null space is a metameric black space.

In another aspect of the invention, generating the transformed Interim Connection Space includes determining a map that characterizes a linear transformation from the transformed Interim Connection Space to the first Interim Connection Space, and determining a map that characterizes a linear transformation from the first Interim Connection Space to the transformed Interim Connection Space.

In still another example aspect of the present invention, generating the transformed Interim Connection Space includes determining a map that characterizes a linear transformation from the transformed Interim Connection Space to the full spectral space, and determining a map that characterizes a linear transformation from the full spectral space to the transformed Interim Connection Space.

In another example embodiment of the present invention, source image data is rendered on a destination device by accessing the source image data, transforming the source image data into a transformed Interim Connection Space to obtain Interim Connection Space data, mapping the Interim Connection Space data to a gamut of the destination device, and rendering the mapped data on the destination device.

The invention may be embodied in a method, apparatus or computer-executable program code.

This brief summary has been provided so that the nature of the invention may be understood quickly. A more complete understanding of the invention can be obtained by reference to the following detailed description in connection with the attached drawings.

DETAILED DESCRIPTION OF EXAMPLE EMBODIMENTS

Figure 1:
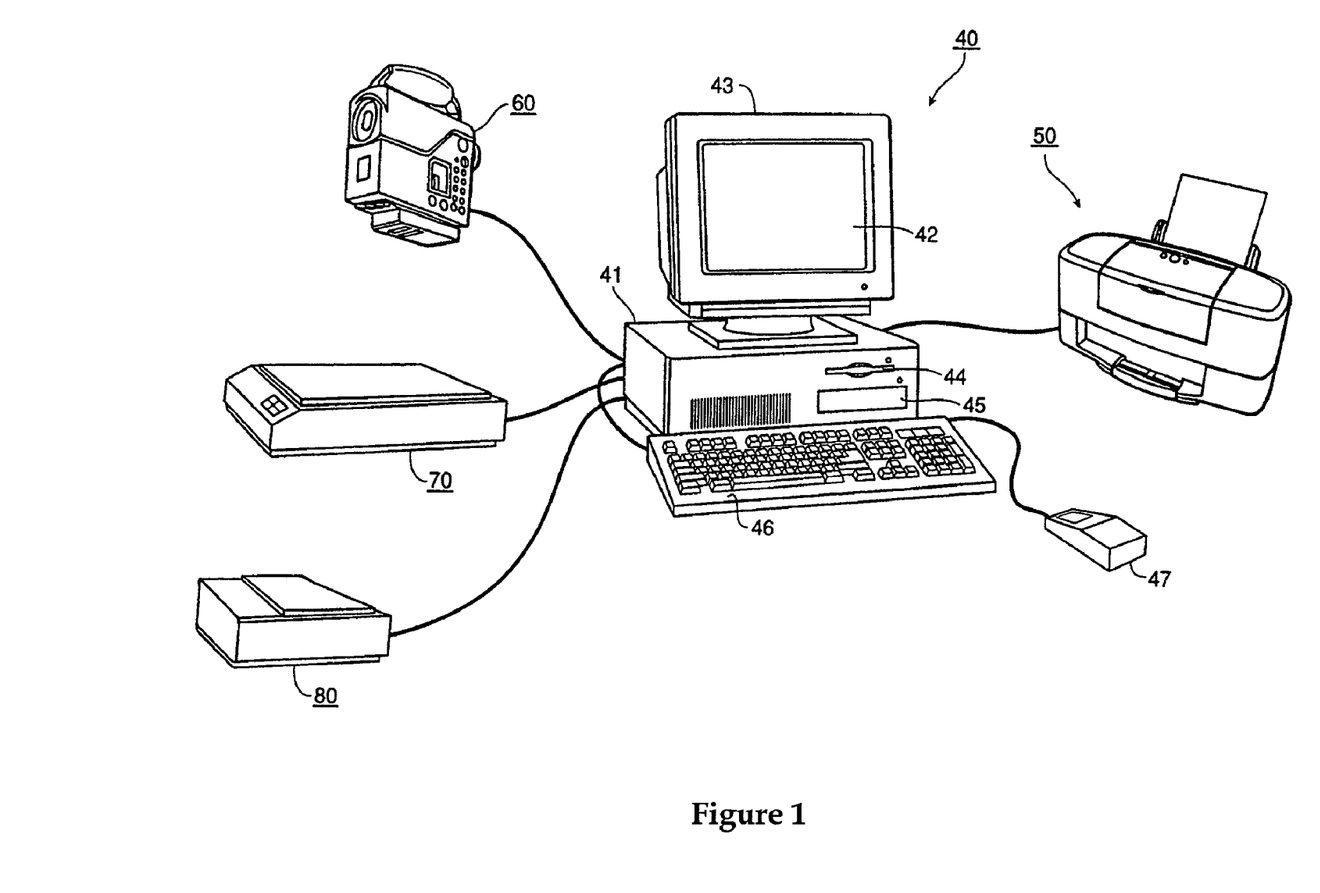
FIG. 1 is a perspective view of an exemplary computing environment in which the present invention may be implemented.

FIG. 1 is a perspective view of a representative computing system including a data processing system 40, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera, a server on a local area network, the Internet, etc. (not shown). A spectrophotometer 80 may be provided for measuring the spectral reflectance of a color sample, and sending the spectral data to data processing system 40.

Figure 2:
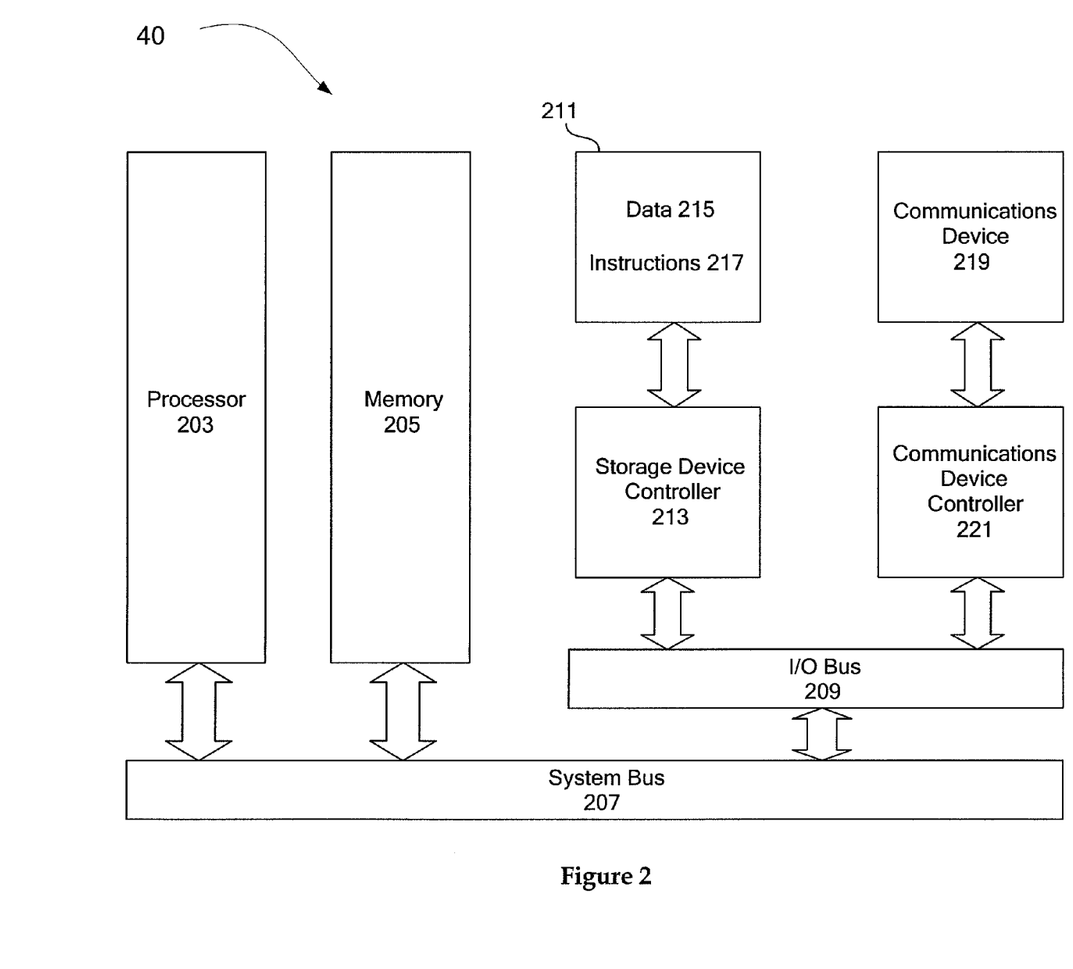
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of the present invention, as described in more detail below.

Figure 3:
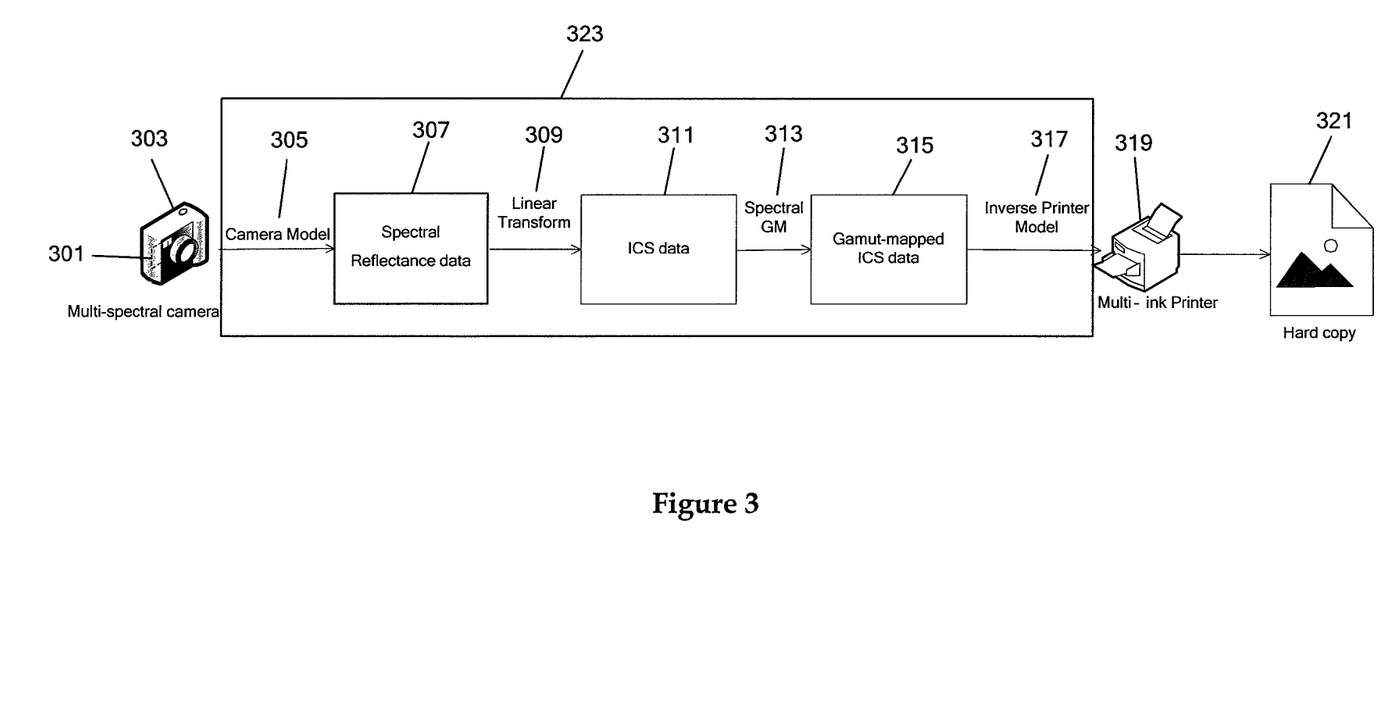
FIG. 3 is a representational diagram of one example embodiment of the present invention.

FIG. 3 shows one example embodiment of the present invention. In particular, FIG. 3 shows an example printer workflow utilizing an ICS generated by methods of the present invention.

In the present example workflow of FIG. 3, source image data 301 from a source multi-spectral device, such as a multi-spectral camera 303, is converted into spectral reflectance data 307 using a device transform, such as a camera model 305. Spectral reflectance data 307 is transformed into ICS data 311 using a linear transform 309, such as a transform generated by one of the example methods described below. A spectral gamut-mapping 313 is performed on ICS data 311 to obtain gamut-mapped ICS data 315. An inverse printer model 317 is applied to gamut-mapped ICS data 315, and the resulting data is sent to a multi-ink output printer 319, for example, which produces a hard copy 321 of image data 301.

Elements 305 to 317 of FIG. 3 define a color management module (CMM) 323, which can be implemented, for example, as part of program instructions 217 executed by data processing system 40 of FIG. 2.

The workflow of FIG. 3 performs gamut-mapping within an ICS. In order to transform image data into the ICS, this example workflow first converts image data from a camera or other device into spectral reflectance data, and then utilizes a linear transform 309 to transform the spectral data into ICS data. In this regard, linear transform 309 specifies the transformation from a full spectral space to the ICS.

In general, an ICS is fully specified by (1) a subspace W of a full spectral space $S \subset R^N$ (N=31 for example), (2) a transformation P from S to $\overline{W}$, and (3) a transformation from Q from W to S. The example workflow of FIG. 3 utilizes an ICS (W) through linear transformation 309, which is an example of a transformation P from S to W. Other workflows can utilize a transformation P and/or a transformation Q to transform data into and out of the ICS as needed to perform other workflow functions.

While P and Q are linear transformations in the example embodiments described herein, P and Q need not be linear. In addition, it is noted that simply specifying the subspace W does not necessarily specify an ICS fully, although it may be possible to make assumptions and take P to be the orthogonal projection, and Q the inclusion map.

The example printer workflow shown in FIG. 3 includes a spectral gamut mapping sG (313) that takes place in an ICS W. In a first construction, this ICS will simply satisfy the description above without further additional properties.

A second construction of an ICS is possible when the spectral gamut mapping has an underlying structure. More precisely, $$\begin{array}{ccc} W & \xrightarrow{sG} & W \\ \Gamma Q \downarrow & & \downarrow \Gamma Q \\ X & \xrightarrow{G} & X \end{array}$$

for some space X, "lower layer" gamut mapping G:X→X, and linear transformation Γ:S→X.

For example, X can be the XYZ space under illuminant D50, and Γ can be the Standard Observer under illuminant D50. The map G can be a gamut mapping on the calorimetric level. In general, map G need not be linear and, in fact, can be of arbitrary complexity and construction. For example, G may have been constructed in some other space related to X but not X itself. In the XYZ example, G could have been constructed in a space such as, for example, CIELAB space or CAM space. For example, the space X can be D50 XYZ, and G can be a "hue-preserving minimum distance mapping" in LAB space, as shown below:

$$\begin{array}{ccc} XYZ & \xrightarrow{G} & XYZ \\ \downarrow & & \uparrow \\ LAB & \xrightarrow{\text{"HPMinDE"}} & LAB \end{array}$$

In another example, the linear map Γ is based on spectral sensitivity curves of sensors. In general, a sensitivity curve $\rho(\lambda)$ gives rise to a linear function from S to real numbers:

$$x(\lambda) \mapsto \int x(\lambda)\rho(\lambda)d\lambda$$

For example, a trichromatic sensor has three sensitivity curves, and consequently, space X is a 3-dimensional space of sensor responses. One example of the sensitivity curves is the Standard Observer under a particular illuminant. In this case, if the spectral power distribution (SPD) of the illuminant is $I(\lambda)$, then the three curves $\overline{x}(\lambda)I(\lambda)$, $\overline{y}(\lambda)I(\lambda)$, $\overline{z}(\lambda)I(\lambda)$ give rise to a space X, which is the CIEXYZ space. At the other extreme, $\rho(\lambda)$ could be an impulse function located at a wavelength. For example, say three wavelengths $\lambda_1, \lambda_2, \lambda_3$ are chosen, then the linear map Γ can be the operation of "taking the values at these wavelengths", i.e., $$\Gamma(x) = (x(\lambda_1), x(\lambda_2), x(\lambda_3))^T$$

These wavelengths could, for instance, be chosen to correspond to the local maxima of the CIE Color Matching Functions $\overline{x}(\lambda), \overline{y}(\lambda), \overline{z}(\lambda)$. This map could be interesting because it is independent of the illuminant, unlike the linear map into XYZ described above.

When the spectral gamut mapping has an underlying structure described above, it is possible to perform a second construction on the original ICS W to give a new ICS CW. The new ICS is said to be a Constrained ICS relative to the linear map Γ. In contrast, the original ICS may be called "unconstrained". The Constrained ICS has the advantage that points of W that are constant along the linear map Γ are characterized as coordinate planes in CW. This property leads to great ease in geometric computation of spectral gamut mapping sG.

Unconstrained ICS

An unconstrained ICS can be constructed, for example, from raw spectral measurements, such as spectral reflectance data. For example, suppose that the raw reflectance measurements of a set of color samples have a common starting wavelength $\lambda_0$, number of wavelength bands N and wavelength step size $\Delta\lambda$. This can typically be achieved by re-sampling and normalization, for example. Denote by $S \subset R^N$ the full spectral space with the same starting wavelength, number of wavelength bands and wavelength step. The dimension of the full spectral space typically is high, e.g., a full spectral space based on raw spectral measurements at 31 distinct wavelengths has a dimension of 31.

One method to reduce the dimension of the full spectral space, and to construct an ICS, is to apply singular value decomposition (SVD) to the raw spectral measurements. For example, SVD of a matrix of raw spectral measurements of a 31-dimensional spectral space yields 31 orthogonal singular vectors. Each of the vectors has a corresponding singular value, which is a measure of the relative significance of the vector. By selecting only a limited number of the most significant vectors, for example 5 to 8 vectors, a set of basis functions can be obtained. The basis functions span a subspace of the full spectral space and define one ICS, if P and Q are taken to be the orthogonal projection and inclusion map respectively.

The above example of direct application of SVD to spectral measurements yields an ICS that has minimized total spectral root-mean-square (RMS) error, which can be advantageous in certain applications. On the other hand, spectral RMS error does not necessarily correlate with perceptual error of human vision. In this regard, another way to construct an ICS utilizes a Spectral Weighting Function $\overline{w}(\lambda)$ that is based on a wavelength dependence of a predetermined sensor. An overview of the use of Spectral Weighting Functions in the generation of ICSs will now be presented.

Figure 4:
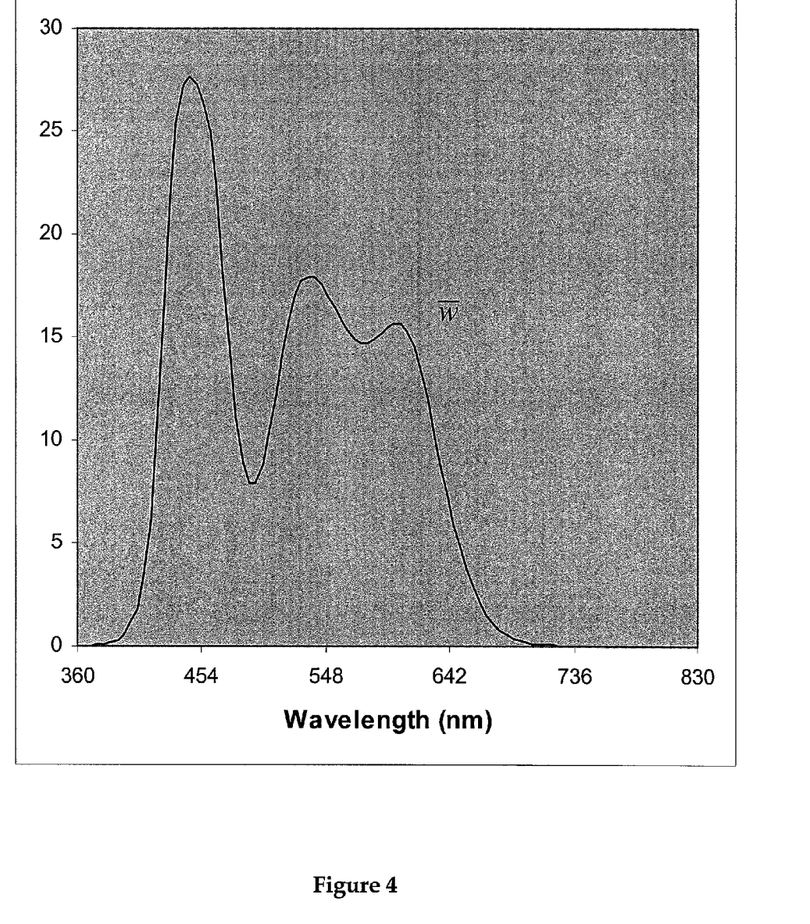
FIG. 4 is a graph of an example Spectral Weighting Function that can be implemented in embodiments of the present invention.

FIG. 4 shows one example Spectral Weighting Function that is based on a wavelength dependence of human vision. In general terms, a Spectral Weighting Function is constructed so that more weight is put on a wavelength if the sensor, e.g. the human visual system, is more sensitive to that wavelength. In particular, the maxima of the curve in FIG. 4 coincide with the maxima of the CIE Color Matching Functions. Construction of Spectral Weighting Functions is described in more detail in copending U.S. patent application Ser. No. 11/609,280, "CONSTRUCTING BASIS FUNCTIONS USING SENSOR WAVELENGTH DEPENDENCE", filed on Dec. 11, 2006, now issued as U.S. Pat. No. 7,860,304, the contents of which are incorporated by reference herein.

Once a Spectral Weighting Function is chosen, a "Weighted Spectral Space", $wS \subset R^N$, is constructed. The Weighted Spectral Space is related to the original spectral space by a diagonal scaling matrix $\overline{W}$:

$$S \to wS$$
$$x \mapsto \overline{W}x$$

where $$\overline{W} = \begin{pmatrix} \overline{w}_0 & & & \\ & \overline{w}_1 & & 0 \\ 0 & & \ddots & \\ & & & \overline{w}_{N-1} \end{pmatrix}$$

$\overline{w}_0, \overline{w}_1, \ldots, \overline{w}_{N-1}$ are simply the values of the Spectral Weighting Function at the corresponding wavelengths. In the case that the raw spectral measurement data of the spectral space consists of measurements of M color samples on N wavelengths, the weighted spectral measurement data can be organized in an M×N matrix A. This matrix A is processed with SVD to obtain the following decomposition:

$$A = \tilde{U}\tilde{D}V^T$$

where:
- $\tilde{U}$ is an M×N matrix with orthogonally independent columns of unit length,
- $\tilde{D}$ is a diagonal matrix of singular values in non-increasing order of magnitudes, and
- V is an N×N orthogonal matrix.

The columns of V are basis functions in wS. An n-dimensional ICS, $W_n \subseteq wS$, can be constructed by selecting the first n of the columns of V (corresponding to the first n most significant singular values), and then taking the linear span of the selected columns.

$$W_n = \{p_1v_1 + p_2v_2 + \ldots + p_nv_n | p_1, \ldots, p_n \in R\}$$

where: $V = (v_1 \ldots v_n \ldots v_N)$.

A likely choice for n would be a small integer, e.g. from 5 to 8, although the choice ultimately is guided by the type of device for which the ICS will be used, and how much error is tolerable in the system. For example, for a 6-ink printer with spectrally independent inks, n=6 might be a good choice.

Because V is an orthogonal matrix, the basis functions $v_1, \ldots, v_n$ are unit vectors that are mutually orthogonal. It follows that the natural inner product on $W_n$ agrees with the one on wS. In addition, conversions between $W_n$ and S are linear transformations:

$$Q: W_n \to S$$

$$p = (p_1, \ldots, p_n)^T \mapsto \overline{W}^{-1}(p_1v_1 + p_2v_2 + \ldots + p_nv_n) = \overline{W}^{-1}V_n p$$

and:

$$P: S \to W_n$$

$$x \mapsto (<\overline{W}x, v_1>, <\overline{W}x, v_2>, \ldots, <\overline{W}x, v_n>)^T = V_n^T \overline{W}x$$

where: $V_n = (v_1 \ldots v_n)$

In other words, $W_n$ is a linear subspace of wS, and the conversions are respectively inclusion and orthogonal projection.

Constrained ICS

One goal of separating dimensions along the linear map $\Gamma$ and dimensions complementary to them can be achieved via the linear algebra concept of orthogonality, which can provide one useful framework for the construction of constrained ICSs.

Example Embodiment of Construction of Constrained ICS

One example embodiment of the invention will now be described with reference to FIGS. 5 and 6. This example embodiment illustrates one method of constructing an ICS "constrained by linear map $\Gamma$". The linear map $\Gamma$ is assumed to have full rank, i.e., the image of the map has the same dimension as the space X.

Figure 5:
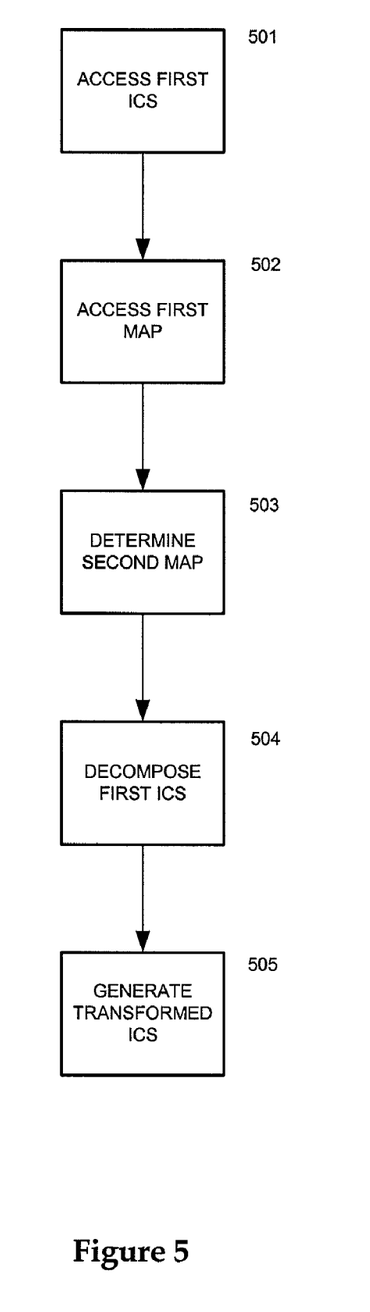
FIG. 5 is a process flowchart of one example method of generating a transformed ICS according to one example embodiment of the present invention.

Referring now to FIG. 5, an ICS W of an N-dimensional full spectral space S is accessed (501). The ICS W is an n-dimensional ICS. For example, an unconstrained ICS, such as one of the unconstrained ICSs as described above, can be selected as the ICS W. Other ICSs can be used as well. The ICS W includes associated linear transformations to and from the full spectral space S:

$$P: S \to W$$
$$Q: W \to S$$

A "constraining" linear map $\Gamma$ is accessed (502). The linear map $\Gamma: S \to X$ goes from S to a k-dimensional space X. The rank of $\Gamma$ is k in this example embodiment. For example, X can be the 3-dimensional CIEXYZ space, and $\Gamma$ can be the operation of spectral integration of the spectral reflectance with the SPD of a chosen illuminant.

A map that characterizes a linear transformation from W to X is determined (503). In particular, the linear transformation Q from W to S and r from S to X are composed:

$$W \xrightarrow{Q} S \xrightarrow{\Gamma} X$$

Accordingly, an overall linear transformation $\Gamma Q$ from W to X, which is represented as a k×n matrix, $M_\Gamma$, is determined.

W is decomposed (504) into orthogonal subspaces, including a first subspace that is a null space of the overall linear transformation $\Gamma Q$, and a second subspace that is an orthogonal complement of the null space in W. In particular, W is decomposed into a direct sum of two orthogonal subspaces: a first subspace B of "free variables"; and a second subspace C of "constrained variables". Because the rank of $\Gamma$ is k, which is also the dimension of X in this example embodiment, then the dimension of C is also k, and the dimension of B is n−k. The null space of matrix $M_\Gamma$ is the subspace B. In other words, $$B=\{p \in W | M_\Gamma p=0\}$$

For example, if X is CIEXYZ space, then subspace B is a metameric black space of XYZ space. Subspace C is the orthogonal complement of B in W. Note that the determination of C depends on the inner product on W, whereas the determination of B does not.

One example method of decomposing W into subspace B and subspace C includes performing an orthogonal transformation on space W, i.e., change of coordinates. An orthogonal transformation can be determined, for example, using eigenvalue analysis, such as SVD. Under the transformed coordinate system, the projections onto B and C are projections onto the coordinate planes of the transformed space, CW.

In the present example embodiment, the orthogonal transformation on W is performed through SVD on the matrix $M_\Gamma$. Namely:

$$M_\Gamma = U_\Gamma D_\Gamma V_\Gamma^T$$

where $U_\Gamma$ and $V_\Gamma$ are k×k, resp. n×n orthogonal matrices, and $D_\Gamma$ is an k×n "diagonal" matrix of singular values sorted in non-increasing order and is of the form:

$$D_\Gamma = (\tilde{D}_\Gamma \vdots 0)$$

where $\tilde{D}_\Gamma$ is a k×k diagonal matrix.

Subspace B and subspace C are used to generate (505) transformed version of ICS W, which is a constrained ICS, denoted CW. In particular, maps characterizing orthogonal transformations (1) from the transformed ICS CW to the ICS W and (2) from the ICS W to the transformed ICS CW are determined. $V_\Gamma$ and $V_\Gamma^T$ are the desired orthogonal transformations for space W, because under this coordinate transformation, $$\begin{pmatrix} c_1 \\ \vdots \\ c_k \\ b_1 \\ \vdots \\ b_{n-k} \end{pmatrix} = V_\Gamma^T \begin{pmatrix} p_1 \\ \vdots \\ p_n \end{pmatrix},$$

so that $M_\Gamma p = U_\Gamma \tilde{D}_\Gamma (c_1 \ldots c_k)^T$. In other words, only the first k coordinates are used to determine the output of $M_\Gamma$, and they provide the coordinates for the subspace C, whereas $b_1, \ldots, b_{n-k}$ provide coordinates for the subspace B.

Further, maps characterizing linear transformations (1) from full spectral space S to the transformed ICS CW and (2) from the transformed ICS CW to full spectral space S can be determined. This example construction of constrained ICS CW results in the following equations that give the transformations going to and from S and CW.

From S to CW: $x \mapsto V_\Gamma^T P x = c \oplus b$

From CW to S: $c \oplus b \mapsto Q V_\Gamma (c \oplus b)$

The subspace C can be identified with X because they are related by a non-singular linear transformation, i.e., a non-singular square matrix of dimension k.

$$C \rightarrow X$$

$$c \mapsto U_\Gamma \tilde{D}_\Gamma c$$

Since $\Gamma$ is assumed to have full rank, the singular values in $\tilde{D}_\Gamma$ are all non-zero, so that it is invertible.

$$X \rightarrow C$$

$$\xi \mapsto \tilde{D}_\Gamma^{-1} U_\Gamma^T \xi$$

Figure 6:
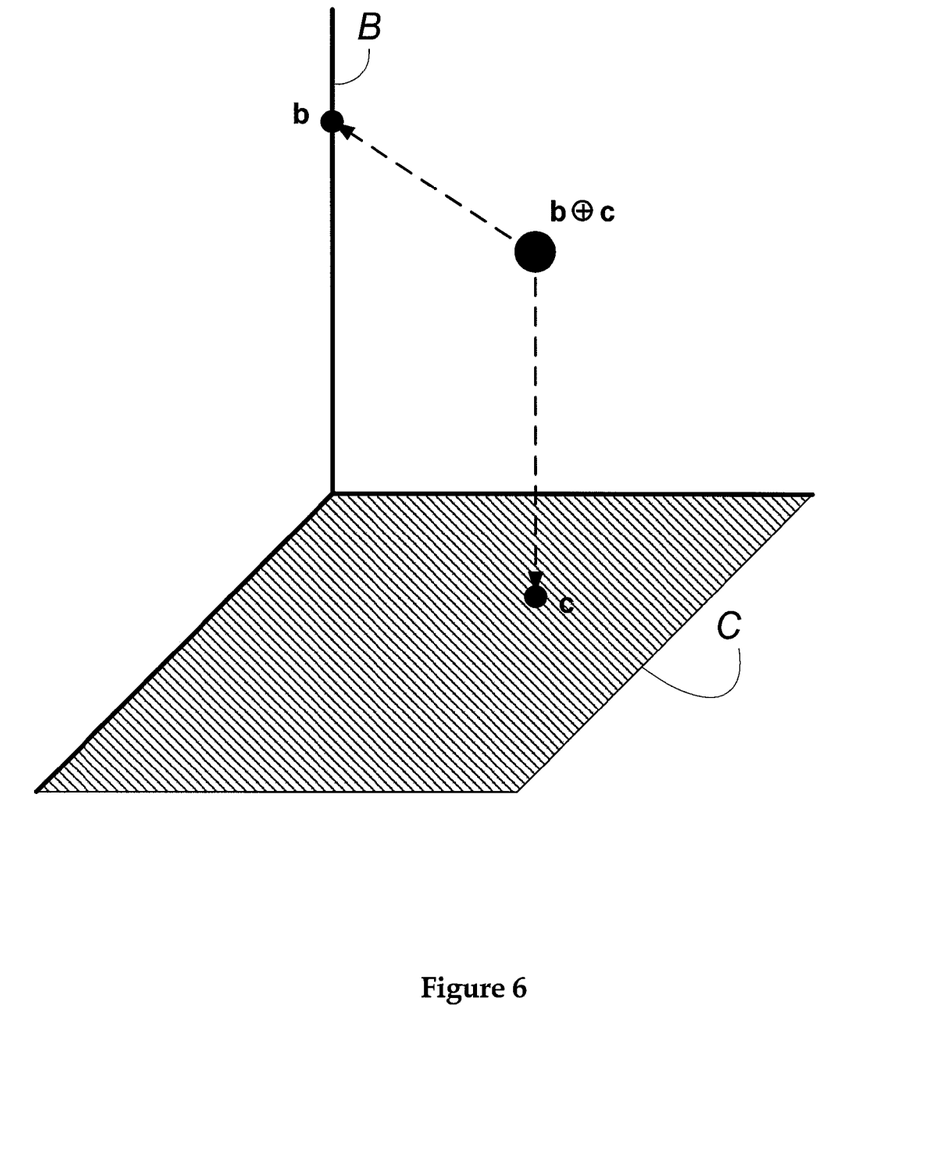
FIG. 6 is an illustrative graph showing a geometry of an example constrained ICS.

FIG. 6 is a graph of an example geometry of a CW. The example geometry is primarily for illustrative purposes, and shows a two-dimensional C subspace and a one-dimensional B subspace. The direct sum c⊕b of subspace C and subspace B is also illustrated.

Example Calculations:

To illustrate construction of a constrained ICS in one example embodiment of the invention, the following example calculation was performed. 729 spectral reflectance measurements were collected for a Canon i9900 inkjet printer using a Gretag Spectroscan, all starting at wavelength 380 nm and sampled at every 10 nm interval, ending at wavelength 730 nm (36 wavelength bands). A Spectral Weighting Function was obtained for this sampling, as follows:

$\overline{W}$=diag{0.220760, 0.716623, 2.305731, 7.336433, 21.712286, 42.717907, 53.871849, 54.325405, 49.228741, 36.543606, 22.387672, 16.026230, 17.688272, 24.221445, 31.502956, 35.189285, 35.563198, 33.910046, 31.601578, 29.827597, 29.397827, 30.256771, 31.150187, 30.352978, 26.712053, 20.805098, 14.757836, 9.538306, 5.615265, 3.035526, 1.604729, 0.799840, 0.396151, 0.201922, 0.101494, 0.050327}

This scaling matrix was applied to each of the 729 measurements to obtain the weighted spectral measurements. For example, a spectral reflectance measurement of x={0.0288, 0.0243, 0.0217, 0.0191, 0.0176, 0.0166, 0.0166, 0.0162, 0.0161, 0.0159, 0.0153, 0.0147, 0.0136, 0.0125, 0.0113, 0.0102, 0.0094, 0.0086, 0.0079, 0.0074, 0.0069, 0.0064, 0.006, 0.0058, 0.0058, 0.0058, 0.0063, 0.0073, 0.0094, 0.0131, 0.0218, 0.046, 0.0973, 0.1763, 0.2701, 0.368$\}^T$ is converted to $\overline{W}$x={0.006358, 0.017414, 0.050034, 0.140126, 0.382136, 0.709117, 0.894273, 0.880072, 0.792583, 0.581043, 0.342531, 0.235586, 0.240561, 0.302768, 0.355983, 0.358931, 0.334294, 0.291626, 0.249652, 0.220724, 0.202845, 0.193643, 0.186901, 0.176047, 0.154930, 0.120670, 0.092974, 0.069630, 0.052783, 0.039765, 0.034983, 0.036793, 0.038545, 0.035599, 0.027414, 0.018520$\}^T$ Repeating this operation for the rest of the 728 measurements and packing them together row by row results in a weighted data matrix A of dimension 729×36. Applying SVD to this matrix results in a $UDV^T$ decomposition. The first 6, i.e. n=6, column vectors in V, were selected, and the following 36×6 matrix $V_6$, was obtained:

$$V_6 = \begin{bmatrix} 0.000468 & 0.000120 & -0.000180 & 0.000250 & -0.000542 & 0.002723 \\ 0.001985 & 0.000986 & -0.001011 & 0.000480 & -0.003314 & 0.011983 \\ 0.008112 & 0.005784 & -0.004794 & -0.000740 & -0.015661 & 0.41423 \\ 0.034981 & 0.030866 & -0.021510 & -0.015848 & -0.067118 & 0.134209 \\ 0.125150 & 0.123674 & -0.075093 & -0.077265 & 0.223709 & 0.313926 \\ 0.264249 & 0.275221 & -0.142269 & -0.152814 & -0.368478 & 0.305537 \\ 0.342587 & 0.363599 & -0.144255 & -0.135022 & -0.250731 & -0.018863 \\ 0.339941 & 0.353697 & -0.087507 & -0.048710 & 0.025548 & 0.228494 \\ 0.301210 & 0.292558 & -0.013899 & 0.047197 & 0.300765 & -0.227813 \\ 0.219021 & 0.186359 & 0.048479 & 0.116085 & 0.425720 & -0.101876 \\ 0.133049 & 0.088761 & 0.072510 & 0.127099 & 0.341731 & 0.050178 \\ 0.096378 & 0.041148 & 0.087059 & 0.132582 & 0.243679 & 0.142112 \\ 0.108069 & 0.016495 & 0.139779 & 0.186645 & 0.186136 & 0.236698 \\ 0.149413 & -0.016812 & 0.248181 & 0.277968 & 0.057011 & 0.299995 \\ 0.195309 & -0.064805 & 0.361744 & 0.303237 & -0.147063 & 0.208664 \\ 0.217077 & -0.114122 & 0.392787 & 0.178661 & -0.259584 & -0.009495 \\ 0.216447 & -0.157762 & 0.344366 & -0.033097 & -0.215830 & -0.232911 \\ 0.201090 & -0.185236 & 0.255327 & -0.233133 & -0.081183 & -0.315440 \\ 0.182985 & -0.194969 & 0.159759 & -0.359179 & 0.062497 & -0.185913 \\ 0.174954 & -0.201647 & 0.065245 & -0.395718 & 0.166668 & 0.077983 \\ 0.181034 & -0.216469 & -0.038307 & -0.322566 & 0.193401 & 0.298246 \\ 0.197695 & -0.241584 & -0.148342 & -0.155563 & 0.141995 & 0.308215 \\ 0.210724 & -0.262783 & -0.242758 & 0.040403 & 0.060536 & 0.126361 \\ 0.209691 & -0.263485 & -0.292202 & 0.185636 & -0.010439 & -0.080240 \\ 0.190710 & -0.236566 & -0.284443 & 0.241542 & -0.059830 & -0.170453 \\ 0.155673 & -0.187608 & -0.232855 & 0.222660 & -0.082661 & -0.146664 \\ 0.116900 & -0.135696 & -0.169588 & 0.173212 & -0.084342 & -0.085978 \\ 0.079439 & -0.089066 & -0.110770 & 0.118298 & -0.069383 & -0.039021 \\ 0.047487 & -0.053048 & -0.065584 & 0.071068 & -0.043233 & -0.021607 \\ 0.025075 & -0.028479 & -0.035503 & 0.038148 & -0.021113 & -0.015900 \\ 0.013416 & -0.014729 & -0.018598 & 0.020548 & -0.012018 & -0.006918 \\ 0.007262 & -0.007219 & -0.008931 & 0.011013 & -0.008533 & 0.000344 \\ 0.004016 & -0.003564 & -0.004123 & 0.006090 & -0.006187 & 0.002498 \\ 0.002261 & -0.001787 & -0.001922 & 0.003539 & -0.004205 & 0.002255 \\ 0.001227 & -0.000863 & -0.000870 & 0.002028 & -0.002563 & 0.001465 \\ 0.000648 & -0.000406 & -0.000384 & 0.001139 & -0.001457 & 0.000831 \end{bmatrix}$$

Having $\overline{W}$ and $V_6$ allows conversion between the full spectral space and $W_6$, the unconstrained ICS in this example. For example, take one of the measurements in the 729 samples:

x={0.0288, 0.0243, 0.0217, 0.0191, 0.0176, 0.0166, 0.0166, 0.0162, 0.0161, 0.0159, 0.0153, 0.0147, 0.0136, 0.0125, 0.0113, 0.0102, 0.0094, 0.0086, 0.0079, 0.0074, 0.0069, 0.0064, 0.006, 0.0058, 0.0058, 0.0058, 0.0063, 0.0073, 0.0094, 0.0131, 0.0218, 0.046, 0.0973, 0.1763, 0.2701, 0.368}$^T$

Applying the matrices $\overline{W}$ and $V_6^T$ in succession results in a value in $W_6$:

p=(1.934899, 0.729409, 0.110950, −0.038918, 0.014459, 0.043356)$^T$.

This result can be transformed back to the full spectral space by applying successively the matrices $V_6$ and $\overline{W}^{-1}$, resulting in the "round-trip" spectrum:

$x_{Roundtrip}$={0.004865, 0.006838, 0.009099, 0.012714, 0.01554, 0.016624, 0.016946, 0.016537, 0.015993, 0.015388, 0.014847, 0.014394, 0.0137, 0.012691, 0.011614, 0.010493, 0.009279, 0.008155, 0.00748, 0.007371, 0.007362, 0.006984, 0.006225, 0.00561, 0.005512, 0.005879, 0.006553, 0.00725, 0.007406, 0.007025, 0.007402, 0.009075, 0.011348, 0.013656, 0.015716, 0.017586}$^T$ NOTE: Compared to the corresponding result obtained by applying the same SVD procedure but without the scaling matrix $\overline{W}$, this appears to have high spectral RMS error, but it has small $\Delta E_{94}$ errors under various illuminants:

|  | Roundtrip with $\overline{W}$ | Roundtrip without $\overline{W}$ |
| --- | --- | --- |
| Spectral RMS error | 0.078888 | 0.013781 |
| $\Delta E_{94}$ under D50 | 1.187955 | 8.922276 |
| $\Delta E_{94}$ under D65 | 1.073018 | 7.789062 |
| $\Delta E_{94}$ under C | 1.017545 | 7.217335 |
| $\Delta E_{94}$ under F2 | 0.134643 | 8.04224 |
| $\Delta E_{94}$ under F7 | 0.449007 | 7.12073 |
| $\Delta E_{94}$ under F11 | 0.163016 | 16.222683 |

Returning to the example calculation, a constrained ICS is calculated. In this example, a map that converts spectral reflectances to XYZ under illuminant D50 is used for the constraint map Γ. Using the computed matrix $V_6$, $M_Γ$ is calculated:

$$M_Γ = \begin{pmatrix} 0.640812 & -0.565338 & -0.37457 & 0.013264 & 0.031133 & -0.004076 \\ 0.630899 & -0.525419 & 0.235318 & -0.065993 & 0.04996 & 0.076782 \\ 0.502987 & 0.432418 & 0.00912 & 0.089346 & 0.244595 & 0.089809 \end{pmatrix}$$

SVD is performed on $M_Γ$, resulting in the following matrices:

$$U_Γ = \begin{pmatrix} -0.734097 & 0.153984 & 0.661355 \\ -0.6644192 & 0.039757 & -0.746504 \\ -0.141244 & -0.987273 & 0.073089 \end{pmatrix}$$

$$\tilde{D}_Γ = \begin{pmatrix} 1.201159 & 0 & 0 \\ 0 & 0.706233 & 0 \\ 0 & 0 & 0.433963 \end{pmatrix}$$

$$V_Γ = \begin{pmatrix} -0.799645 & -0.527911 & -0.02397 & 0.198697 & -0.047903 & 0.198818 \\ 0.585198 & -0.757338 & 0.115089 & 0.233437 & 0.013943 & 0.126686 \\ 0.097728 & -0.081172 & -0.974098 & -0.075797 & -0.136578 & 0.102934 \\ 0.017879 & -0.125723 & 0.148784 & -0.8112 & -0.117697 & 0.538367 \\ -0.075415 & -0.332329 & 0.0027 & -0.444768 & -0.228827 & -0.796042 \\ -0.050527 & -0.122114 & -0.123167 & -0.210755 & 0.955324 & -0.101511 \end{pmatrix}$$

Referring to the same example reflectance x used above for the purpose of illustration:

x={0.0288, 0.0243, 0.0217, 0.0191, 0.0176, 0.0166,
0.0166, 0.0162, 0.0161, 0.0159, 0.0153, 0.0147,
0.0136, 0.0125, 0.0113, 0.0102, 0.0094, 0.0086,
0.0079, 0.0074, 0.0069, 0.0064, 0.006, 0.0058,
0.0058, 0.0058, 0.0063, 0.0073, 0.0094, 0.0131,
0.0218, 0.046, 0.0973, 0.1763, 0.2701, 0.368$\}^T$ and applying $\overline{W}$, $V_6^T$ and $V_Γ^T$ in succession to x results in the following $CW_6$ value:

$c \oplus b = (-1.113517, -1.588076, -0.0816, 0.562321, -0.05498, 0.451656)^T$.

The first three components $c = (-1.113517, -1.588076, -0.0816)^T$ include enough information to recover the XYZ values that correspond to x. To demonstrate this, first note that the reflectance x would give an XYZ of 0.008338, 0.008856, 0.013172 under D50. In other words, $Γx = (0.008338, 0.008856, 0.013172)^T$.

On the other hand, applying the matrices $\tilde{D}_Γ$ and $U_Γ$ to c yields an XYZ of 0.007857, 0.008702, 0.012936, i.e.:

$U_Γ \tilde{D}_Γ c = (0.007857, 0.008702, 0.012936)^T$

The $\Delta E_{94}$ under D50 between these two colors is 1.187955, which is the same round-trip error obtained in $W_6$. This result is expected, because the transformation between $W_6$ and $CW_6$ is an orthogonal transformation, namely $V_Γ$. It follows that both spaces have the same errors, but $CW_6$ has been oriented so that its coordinate system gives a straightforward decomposition into the "calorimetric" component (C space) and the "black" component (B space).

Although the invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method for generating a transformed Interim Connection Space for spectral data, the method comprising:
    accessing a first Interim Connection Space for spectral data in a full spectral space;
    accessing a first map, which characterizes a linear transformation from the full spectral space to a first color space;
    determining a second map, which characterizes a linear transformation from the first Interim Connection Space to the first color space;
    decomposing, using a processor, the first Interim Connection Space into orthogonal subspaces, the orthogonal subspaces including a first subspace that is a null space of the second map and a second subspace that is an orthogonal complement of the null space in the first Interim Connection Space; and
    generating the transformed Interim Connection Space based on the first subspace and the second subspace.

2. The method of claim 1, wherein decomposing the first Interim Connection Space comprises:
    performing eigen-analysis of the second map to obtain the first space and the second space.

3. The method of claim 2, wherein the second map is described by a matrix, and performing eigen-analysis of the second map comprises:
    performing singular value decomposition on the matrix.

4. The method of claim 1, wherein the null space is a metameric black space.

5. The method of claim 1, further comprises:
    determining a map that characterizes a linear transformation from the transformed Interim Connection Space to the first Interim Connection Space; and determining a map that characterizes a linear transformation from the first Interim Connection Space to the transformed Interim Connection Space.

6. The method of claim 1, further comprises:
determining a map that characterizes a linear transformation from the transformed Interim Connection Space to the full spectral space; and
determining a map that characterizes a linear transformation from the full spectral space to the transformed Interim Connection Space.

7. A method of rendering source image data on a destination device, the method comprising:
accessing the source image data;
transforming the source image data into a transformed Interim Connection Space generated by the method of claim 1 to obtain Interim Connection Space data;
mapping the Interim Connection Space data to a gamut of the destination device; and
rendering the mapped data on the destination device.

8. An apparatus for generating a transformed Interim Connection Space for spectral data, the apparatus comprising:
an access unit that accesses a first Interim Connection Space for spectral data in a full spectral space and a first map, which characterizes a linear transformation from the full spectral space to a first color space;
a determination unit that determines a second map, which characterizes a linear transformation from the first Interim Connection Space to the first color space;
a decomposition unit that decomposes the first Interim Connection Space into orthogonal subspaces, the orthogonal subspaces including a first subspace that is a null space of the second map and a second subspace that is an orthogonal complement of the null space in the first Interim Connection Space; and
a generation unit that generates the transformed Interim Connection Space based on the first subspace and the second subspace.

9. The apparatus of claim 8, wherein decomposing of the first Interim Connection Space by the decomposition unit comprises:
performing eigen-analysis of the second map to obtain the first subspace and the second subspace.

10. The apparatus of claim 9, wherein the second map is described by a matrix, and performing eigen-analysis of the second map comprises:
performing singular value decomposition on the matrix.

11. The apparatus of claim 8, wherein the null space is a metameric black space.

12. The apparatus of claim 8, wherein the generation unit is further constructed for:
determining a map that characterizes a linear transformation from the transformed Interim Connection Space to the first Interim Connection Space; and
determining a map that characterizes a linear transformation from the first Interim Connection Space to the transformed Interim Connection Space.

13. The apparatus of claim 8, wherein the generation unit is further constructed for:
determining a map that characterizes a linear transformation from the transformed Interim Connection Space to the full spectral space; and
determining a map that characterizes a linear transformation from the full spectral space to the transformed Interim Connection Space.

14. A system for rendering source image data on a destination device, the system comprising:
an input unit that accesses the source image data;
a transformation unit that transforms the source image data into a transformed Interim Connection Space generated by the apparatus of claim 8 to obtain Interim Connection Space data;
a mapping unit that maps the Interim Connection Space data to a gamut of the destination device; and
a rendering unit that renders the mapped data on the destination device.

15. Computer-executable instructions stored on a computer-readable memory medium, the computer-executable instructions executable to generate a transformed Interim Connection Space, said computer-executable process steps comprising process steps executable to perform a method according to any of claims 1 to 7.

16. An apparatus for generating a transformed Interim Connection Space, the apparatus comprising:
a program memory that stores process steps executable to perform a method according to any of claims 1 to 7; and
a processor coupled to the program memory that executes the process steps stored in said program memory.

* * * * *